United States Patent
Parachini et al.

(10) Patent No.: US 8,538,731 B2
(45) Date of Patent: Sep. 17, 2013

(54) ANALOG SENSORS BUS

(75) Inventors: Davide Parachini, Cassano Magnago (IT); Diego Neftali Gutierrez, Varese (IT)

(73) Assignee: Whirlpool Corporation, Benton Harbor, MI (US)

( * ) Notice: Subject to any disclaimer, the term of this patent is extended or adjusted under 35 U.S.C. 154(b) by 734 days.

(21) Appl. No.: 12/275,255

(22) Filed: Nov. 21, 2008

(65) Prior Publication Data
US 2009/0138241 A1 May 28, 2009

(30) Foreign Application Priority Data
Nov. 22, 2007 (EP) .................................. 07121282

(51) Int. Cl.
| | |
|---|---|
| H04B 3/50 | (2006.01) |
| G08C 19/04 | (2006.01) |
| G08C 19/06 | (2006.01) |
| G08C 19/10 | (2006.01) |
| G08C 19/12 | (2006.01) |
| H04Q 9/06 | (2006.01) |

(52) U.S. Cl.
USPC ........................................................ 702/188

(58) Field of Classification Search
USPC .................. 702/188; 340/870.11, 870.27
See application file for complete search history.

(56) References Cited

U.S. PATENT DOCUMENTS

| | | | |
|---|---|---|---|
| 3,587,076 A * | 6/1971 | Grover ..................... 340/870.11 |
| 4,348,671 A * | 9/1982 | Nussbaum ................. 340/854.9 |
| 4,355,537 A * | 10/1982 | vander Have ................... 73/708 |
| 4,818,994 A | 4/1989 | Orth et al. |
| 5,097,703 A | 3/1992 | Peter |
| 5,159,277 A * | 10/1992 | Mount .......................... 324/721 |
| 5,200,930 A | 4/1993 | Rouquette |
| 5,231,359 A * | 7/1993 | Masuda et al. ................ 324/675 |
| 6,163,723 A | 12/2000 | Roberts et al. |
| 6,345,238 B1 * | 2/2002 | Goodwin ....................... 702/130 |
| 6,409,677 B1 * | 6/2002 | Tulkki ........................... 600/561 |
| 6,429,786 B1 * | 8/2002 | Bansemir et al. ......... 340/870.27 |
| 6,935,173 B2 * | 8/2005 | Stehman et al. ............. 73/304 C |
| 2004/0075450 A1 * | 4/2004 | Buge et al. ..................... 324/710 |
| 2004/0202975 A1 * | 10/2004 | Bird ................................ 431/75 |
| 2006/0156802 A1 * | 7/2006 | Cohen .............................. 73/146 |
| 2009/0086831 A1 * | 4/2009 | Punyko et al. ................. 375/259 |

OTHER PUBLICATIONS

Patrick et al., "A Diode-Based Two-Wire Solution for Temperature-Compensated Piezoresistive Pressure Sensors" *IEEE Transactions on Electron Devices, IEEE Service Center*, Pisacataway. vol. 15, No. 2, 2003.

* cited by examiner

*Primary Examiner* — Sujoy Kundu
*Assistant Examiner* — Regis Betsch
(74) *Attorney, Agent, or Firm* — Diederiks & Whitelaw PLC (57) ABSTRACT

An architecture for the connection and communication of a plurality of passive sensors to a measurement and control system employs an analog communication bus made of two physical wires only. A method for reading the same sensors is also provided.

20 Claims, 6 Drawing Sheets

ANALOG SENSORS BUS

BACKGROUND

Field of the Disclosure

The present disclosure relates to an analog communication bus system through which a common measuring system is connected to a plurality of passive sensors. The physical connection of the analog bus is made with two wires only.

In the field of electronics, there exist sensors which are simply transducers, optionally provided with simple passive circuits (for instance filter), and other more sophisticated sensors provided with additional logic circuits adapted, for instance, to format and to communicate the signals in a suitable form. Such additional communication circuits need to be electrically supplied.

Hereafter with the term "passive sensors" are intended sensors not provided with any communication logic.

Transducers can rely on different physical principles for translating the measured physical quantity into an electrical parameter value. The most common transducers may convert physical quantities in: voltage values (thermopiles, photodiodes used in voltage mode, solar cells and in Hall-effect magnetic sensors), resistance values (temperature dependant resistors like NTC or PT1000, relative humidity transducers), current values (photodiode used in current modality), capacitance values (position sensors, level sensors, touch sensors, pressure sensor) and inductance values (position sensors).

Figure 1:
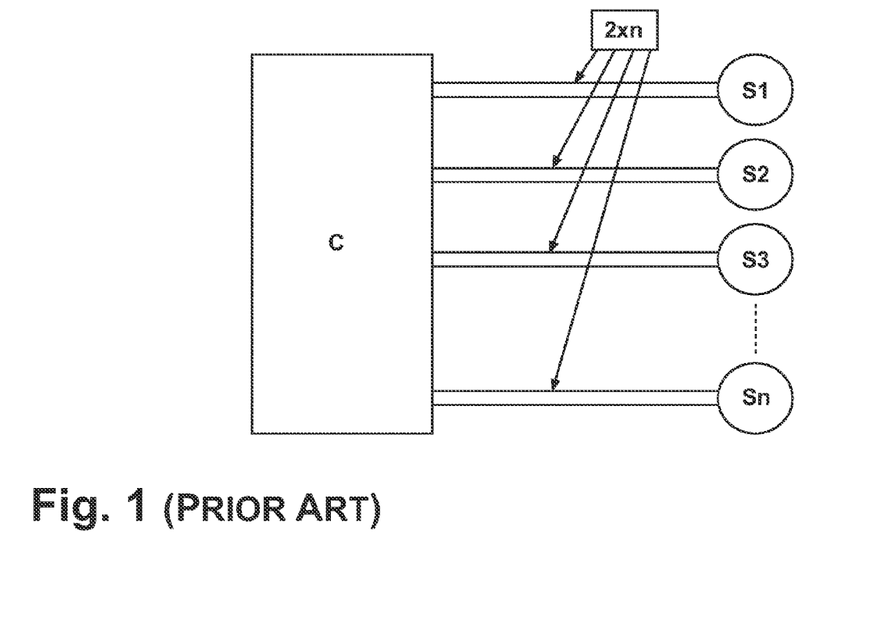
FIG. 1 is an example of connection of the passive sensors to a common control/measuring system, known in the art.

It is usual in the field of the electronic control systems to connect a plurality of passive sensors to a common control/measuring system. This can be easily achieved by connecting each sensor to the control/measuring system with a physical harness whose number of wires is quite large. In fact, this number is normally proportional to the number of sensors connected, 2×n as for instance illustrated with the architecture of FIG. 1, wherein n is the number of sensor used. Moreover, with these architectures when sensors have to be detachably connected to the control/measuring system, for instance in the case of a multi sensor temperature probe, the connector requires to have a number of poles equals to the number of connecting wires, requiring to use complex and expensive connectors.

When the number of connections and wires has to be minimized, i.e. for reducing the cost, the complexity or for other technical constraints, known communication buses architectures with a reduced number of wires can be used. These architectures are typically digital communication network systems known as "field buses". Within this category there exist communication buses which include additional circuits, connected to the sensors with three physical wires, for instance the "Half Duplex" serial transmission buses. In the "Half Duplex" buses one wire carries the reference signal (GND) and the others carry the power supply and the data provided by the circuits in digital format, and using a serial protocol.

In other less sophisticated architectures, it is possible to connect passive sensors by means of a two wires "demultiplexed" transmission line, which anyhow requires a power supply circuit and a relatively large quantity of wires for connecting the "demultiplexer" logic, to the single sensors.

Solutions using only one physical wire connecting logic devices of the same network are also known, for instance the field bus Dallas-Maxim, or the I2C bus. On the side of the communication schemes, in the art are known schemes/methods allowing the connected sensors to exchange data on a common communication bus channel (bus communication methods) such as:

Time-sharing Domain Multiplexing (TDM), in which each single sensor communicates with the common control unit over the communication channel for a defined time slot of the communication frame, as disclosed by in U.S. Pat. No. 4,818,994; and Frequency-sharing Domain Multiplexing (FDM), in which each sensor communicates using a specific frequency band, as disclosed by U.S. Pat. No. 5,200,930. FDM scheme makes the sensors distinguishable over the working frequency band because each sensor is locally connected with active resonant circuits including pulsing oscillators that modulates the sensor signals. Each pulsing oscillator is integrated with its sensor and oscillates with a specific resonant frequency, duly spaced in the frequency band. The integrated device is connected to the communication bus.

Coding Domain Multiplexing (CDM), wherein the sensors connected to the same communication channel communicate in a digital manner are used, in which each sensor includes digital circuits generating a digital code that is "orthogonal" to the codes generated by the others sensors, in order to prevent transmissions errors.

As well a combination of the above-cited methods can be used to improve the performances.

Wireless communication methods are also known, requiring complex communication circuits.

However, all these above mentioned methods require a distributed architecture of sensors equipped with some "intelligence", electronic logic circuits like micro-controllers, timers and modulators. These circuits are adapted to measure the electrical signals generated by the sensor and to translate them into a digital coded form, suitable for the transmission over the communication channel. This also requires the use of intelligent sensors together with power supply circuits, which further increases the number of physical connection to be used.

Moreover, when such "intelligent sensors" have then to be positioned into a hostile environment in which, for instance, the temperature raises above to the maximum rating normally permitted for the silicon ("intelligent") devices (which is around 85° C. for normal IC), all the above mentioned architectures and communication methods cannot be applied without a dramatic cost impact.

Differently, using passive sensors, for which it becomes possible to increase the operating environment temperature above the limits admitted for "intelligent" devices, such problems are solved.

It is also clear from the Ohm's law that when a plurality of bare passive sensors are used, it is not possible to apply any of the above mentioned methods and architectures to make them univocally identifiable. For such reason other passive circuits need to be introduced in the system architecture.

Finally, when dealing with the passive sensors, two is the lowest number of connections/wires for defining a communication channel. In this case the information "standing" in the passive sensors must be selectively read by the common control/measurement system through the communication channel, defining a two-wire analog communication bus. Differently from the passive sensors, the control/measurement system can be positioned in a suitable position/environment.

SUMMARY

An aspect is to provide a cheap method for reading passive sensors connected to a communication bus made of two physical wires, and families of bus architectures to which such method is applied, not presenting the drawbacks of the prior art.

Thus, the devices of the present disclosure and the method thereof allow the connection and the communication of a plurality of passive sensors to a common control/measurement system through an analog communication bus made of two physical wires.

A further aspect is to provide a selective measurement method of variable impedance elements included into non linear circuit architectures and connected to a common measurement system by means of a two-wire connection, and related architectures thereof.

BRIEF DESCRIPTION OF THE DRAWINGS

Other features and advantages of the present invention will become readily apparent to the skilled artisan from the following detailed description when read in light of the accompanying drawings, in which.

DETAILED DESCRIPTION OF THE DISCLOSURE

The method according to the present disclosure renders passive sensors distinguishable in the domains of time or of frequencies, over a communication channel made of two wires only. This is in principle obtained applying the method to a nonlinear circuit provided with branches wherein impedance-varying transducers are positioned, such branches being passive sensors, according to the previous given definition. In the method of the present disclosure, one or more branches of the nonlinear circuit architectures containing the transducer is/are selectively activated and read by a common control/measuring system which is connected to the communication channel, and the circuit impedance is afterwards read. A selective activation of the branches (alternatively referred as passive sensors), is obtained by supplying the nonlinear circuit with a plurality of voltage biasing levels, or by applying varying amplitude signals covering the same voltage biasing levels, or with alternate currents provided with different activating frequencies. The impedance contributions given by the single transducers can be further calculated starting from the measured impedance values, through logic or algebraic operations performed by means, for instance, of the same control/measuring system.

The circuits required to selectively activate the circuit branches have not necessarily to be integrated with the common control/measuring system even if they have to be synchronized with it when readings are made.

We also point out that with the wording "selective activation" is intended either the activation of a single branch or the simultaneous activation of more branches with the purpose of excluding the main effects of the "not-activated" branches, and with the effect to obtain an expected relationship between the impedance measured and the branches activated.

In a first set of nonlinear circuit architectures according to the present disclosure, the impedance measurement of the transducers is taken by the common control/measurement system in different time steps during which the circuit is biased with a DC generator (I1) at different DC voltage values, and optionally, after having applied a superposed ac signal through an AC "small signal" generator (I2).

Figure 2:
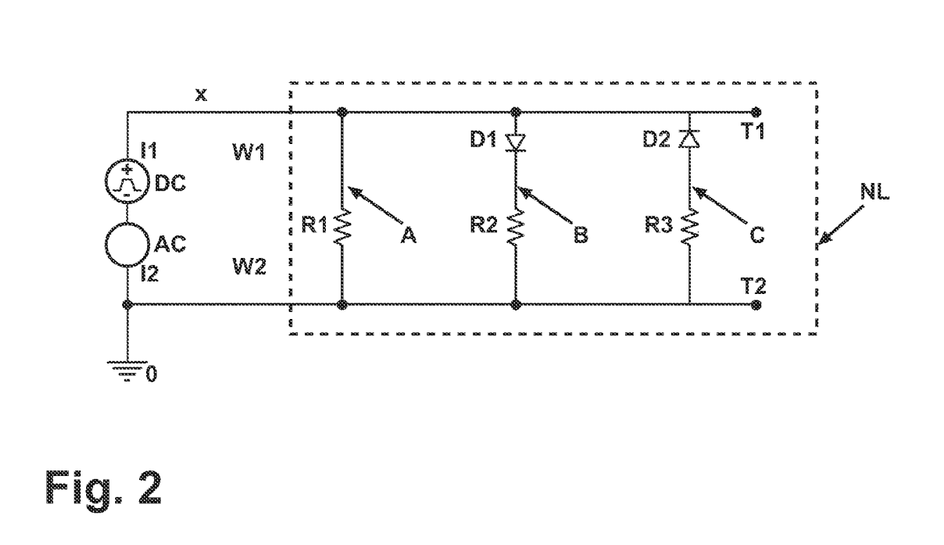
FIG. 2 is a first example of circuit architecture according to the present disclosure to which the method of the present disclosure is applied.

With reference to FIG. 2, the method of the present disclosure is applied to a first nonlinear circuit (NL) provided with three branches (A, B, C), each of the branches including one resistive temperature dependent transducer (R1, R2, R3). The three branches (A, B, C) are connected to the analog, two wires, communication bus, or channel, (W1, W2). In particular, a first resistance varying transducer (R1) is included in a first branch (A) of the circuit (NL) and connected to the analog two-wire bus (W1, W2). The second resistance varying transducer (R2) is connected in series with a first silicon diode (D1), defining a second branch (B) of the non linear circuit (NL) connected to the same bus (W1, W2). In the same way, a third resistance varying transducer (R3) is connected in series with a second silicon diode (D2), defining a third branch (C) of the nonlinear circuit (NL) connected to the bus (W1, W2).

The two silicon diodes (D1, D2) are connected with opposite polarity in series to their respective resistance transducers (R2, R3).

A DC generator (I1) is connected to the bus (W1, W2) and supplies the circuit branches (A, B, C) of the nonlinear circuit (NL) with a voltage whose amplitude can be regulated assuming either positive, negative and substantially null values. These values are useful to interdict, or to forwardly/reversely bias diodes (D1, D2) inserted into their branches (B, C). Two opposite fixed DC sources (not illustrated) can be used for the same purpose instead of the above variable voltage DC generator (I1).

Figure 3:
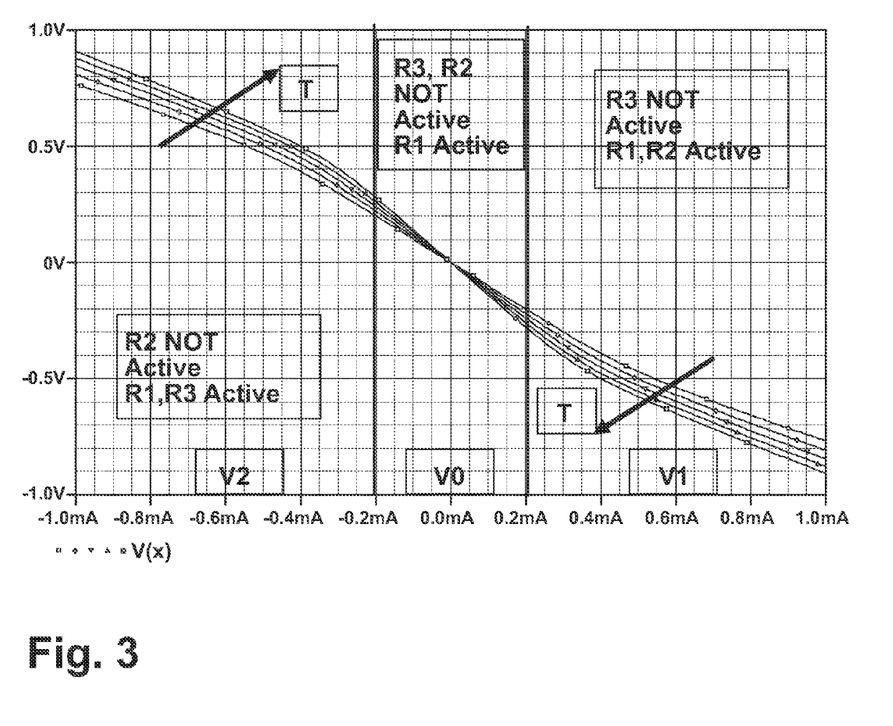
FIG. 3 is the characteristic curve, and it variation with the temperature, referred to the circuit of FIG. 2.

An AC generator (I2) is connected in series to the DC generator (I1) to supply a small signal (for instance 100 mV amplitude) at a relatively low frequency (for instance between 5 and 10 kHz). A suitable electronic control/measuring circuit (not shown) is connected to the cable terminals (T1, T2) of the bus (W1, W2) to measure the differential resistance (or more generally the impedance), related to the small signal generated by the AC generator (I2) while a proper bias value is supplied to the circuit by regulating the voltage DC generator (I1). The use of differential measurements of impedance reduces the dependence of the silicon-diode parameters from the temperature. Working with their differential resistance, rather that with their static resistance, which is higher, the dependency from the temperature of the measures is lower and negligible. This is particularly the case when the transducers are temperature sensors integrated into a temperature probe device (for cooking or automotive usage), exposed to high temperatures. In FIG. 3 it is plotted the characteristic curve of the nonlinear circuit (NL) in FIG. 2, showing its variation with the temperature. The central zone, around the axis origin, represents the area of activation of the first branch (A) only, in which the first transducer (R1) can be read without an impact of the main effects of the other not activated branches. On the right side of the characteristic curve the first branch (A) and the second branch (B) are both activated. The resistance read by the common control/measurement system is related the first transducer (R1) in parallel with the second transducer (R2). Similarly, in the left portion of the characteristic curve the first branch (A) and the third branch (C) are both activated, the first transducer (R1) being in parallel with the third transducer (R3). In the plots the direction of the arrows indicates the increasing values of the temperature. In cases for which the temperature is stable, i.e. when transducer is not for measuring the temperature, the static resistance measurement, rather than differential, is applicable.

In a first step of the method a small bias voltage (V0) is applied to the nonlinear circuit (NL) through the DC generator (I1), upon which an AC small signal supplied by the AC generator (I2) is superposed. The overall amplitude of the current used to perform this step is small enough to avoid any conduction of the first and second diode (D1, D2), activating only the first branch (A) of the non liner circuit (NL). Therefore the differential resistance measured at the terminals (T1, T2) by the common control/measurement system is equal to the resistance of the first resistance varying transducer (R1).

In a second step a first suitable positive DC bias (V1) is applied by the DC generator (I1) to which the AC small signal supplied by the AC generator (I2) is superposed. The first diode (D1) becomes forwardly biased, resulting in the selective activation the first branch (A) and the second branch (B) of the non linear circuit (NL). Being the second diode (D2) provided with a reverse bias, through the third branch (C) of the circuit is not flowing any current. The total differential resistance measured at the terminals (T1, T2) is the resistance related to the parallel connection of the resistance of the first resistance varying transducer (R1) (which is known by the first measurement step), in parallel with the series of the second resistance varying transducer (R2) and the differential resistance of the first diode (D1) (biased at first DC bias voltage (V1) value). Being the differential resistance of the first diode (D1) substantially not dependent from the temperature, it can be considered constant at the different temperature values and integrated as a whole with the resistance provided by the transducer.

The resistance contribution of the second resistance varying transducer (R2) can be consequently calculated in an easy manner with a computing operation (i.e. by the arithmetic/logic unit included in the common control/measurement system).

In a third step a second DC bias voltage (V2) is applied by the DC generator (I1) reversed in its amplitude compared with the second step and, and great enough to bias forwardly the second diode (D2). In a similar manner for the second step both the first branch (A) and the third branch (C) are selectively activated and an AC small signal supplied by the AC generator (I2) is superposed. The current flows through the first resistance varying transducer (R1), as well through the second diode (D2), now directly biased, and through the third resistance varying transducer (R3). The total differential resistance measured between the terminals (T1, T2) relates to the parallel connection of the resistance of the first resistance varying transducer (R1) (which is known by the first measuring step), in parallel with the series of the resistance composed by the resistance of the third resistance varying transducer (R3) and the differential resistance of the second diode (D2) (biased at second DC bias voltage (V2) value). As for the previous step, the resistance contribution of the third resistive varying transducer (R3) can be calculated with an easy computing operation.

Figure 4:
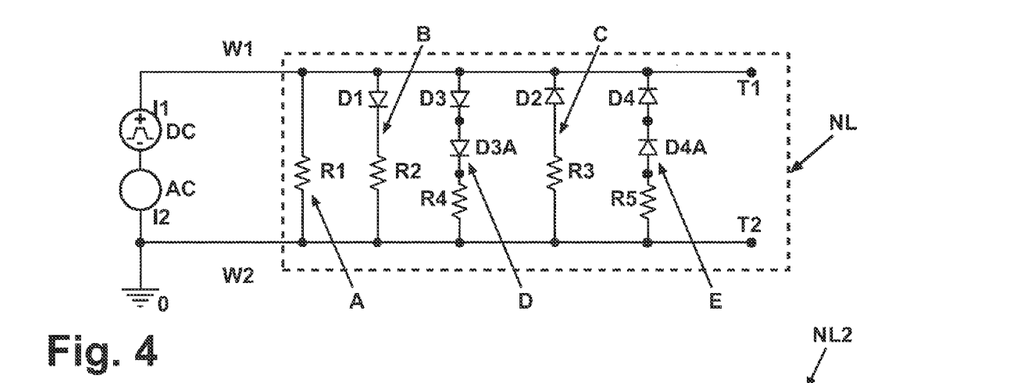
FIG. 4 is an extended similar to the one shown in FIG. 2, with two additional passive sensors connected.

In case of having more than three resistive transducers to be connected, more silicon diodes need to be introduced into the nonlinear circuit (NL1), as for instance shown in FIG. 4, wherein five sensors (R1, R2, R3, R4, R5) are included and diodes D3, D3A, D4 and D4A have been introduced in the nonlinear circuit. Supplying the circuit with the proper DC polarities and amplitudes, branches are selectively activated. In fact with the voltage polarity the diodes can be forwardly or reversed biased and therefore some branches activated or inhibited. Varying the DC biasing amplitude, the branches with diodes forwardly biased are activated whenever the voltage applied by the DC generator (I1) exceeds the value needed to activate all the diodes included in the same branch.

The resistance value assumed from the sensors can be similarly calculated through quite simple computing operations.

Other diodes can be added if more sensors are used. Zener diodes can also be used instead of silicon diodes.

Figure 5:
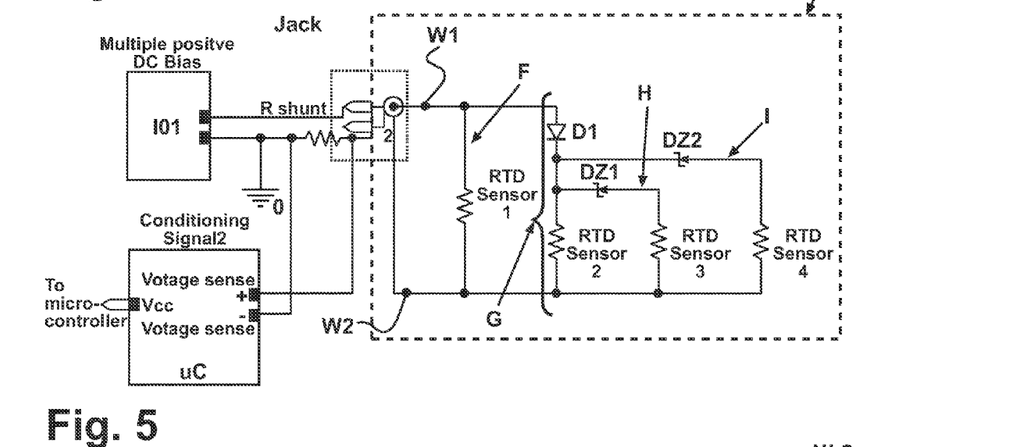
FIG. 5 is a second example of circuit architecture according to the present disclosure in which the method of the present disclosure is applied.

In FIG. 5 it is described a second embodiment (NL2) of the first nonlinear circuit architecture, to which the method of the present disclosure is applied. This circuit design (NL2) is applicable when both positive and negative fixed DC voltage sources, for instance, are not present on the electronic board to which the sensors are connected through the two-wire bus (W1, W2). According to this embodiment the nonlinear circuit (NL2) is fed with a DC generator (I01) that can supply only a positive or a negative voltage.

Similarly to the previous nonlinear circuits (NL, NL1), a selective activation of the circuit branches (F, G, H, I) for reading the plurality of passive sensors (RTD sensor 1, RTD sensor 2, RTD sensor 3, RTD sensor 4) is obtained introducing in the design of the circuit a silicon diode (D1) and n−2 Zener diodes (DZ1, DZ2), being n (n=4 for the described example) the number of the sensors connected to the two wire analog bus. Zener diodes (DZ1, DZ2) are used in reverse polarization provided with different Zener voltages, for instance VZ(D1)=2.7 Volt and VZ(D2)=3.3 Volt. Their behavior is more stable with the temperature. This design allows to measure the low resistance of the Zener diodes combined with the dynamic resistance of the passive sensors, when the non linear circuit (NL2) is biased by the DC generator (I01) with proper n bias voltage values (V0, V1, V2 . . . Vn−1). Also in this case, an AC small signal generated by an AC generator (not shown) can be superposed to the DC generator (I01), when required to perform a differential measurement of the resistance.

The branches (F, G, H, I) of the circuit are selectively activated when supplying the non linear circuit with n different voltage biasing values (V0, V1, V2 . . . , Vn−1) by means of the DC generator (I01). This is performed in different time steps, in which the measurements to determine the varying resistance of the n traducers are also made.

The n voltage biasing values (V0, V1, V2, . . . , Vn−1), are all of the same polarity (either all positive, or all negative), and are provided with a magnitude that can selectively activate the circuit branches, including an interdiction voltage level (V0) for which, at the initial step, all the diodes do not conduit and the first resistance varying transducer (RTD sensor 1) can be read.

Passive sensors, which are the single branches (F, G, H, I) of the non linear circuit (NL2) connected to the bus (W1, W2), are read by the common control/measurement system (uC)

through the current flowing in a shunt resistance (R shunt) in series with one of the lines of the same bus (W1 or W2).

The n resistance contributions of the sensors are obtained applying straightforward calculations, as for the previous cases.

Other diodes can be added if using more sensors.

A detachable two-wires connection (jack) rated to operate in high temperature environments connects the common control/measuring system (uC) with the passive sensors used in a cooking oven that are part, for instance, of a meat probe provided with multiple temperature passive sensors. The passive sensors, together with the detachable connection, are located into a hostile environment, such as the high temperature environment of the oven cavity, while the common control/measurement system and the generators are positioned into the oven chassis. The physical connection of the common control/measurement system with the sensors through the two-wires connection (jack) is made with the two wires bus (W1, W2). Being the sensors passive, adapted to resist at that temperature, a reliable sensing system composed of a plurality of passive sensors, is obtained for such environment.

Figure 6:
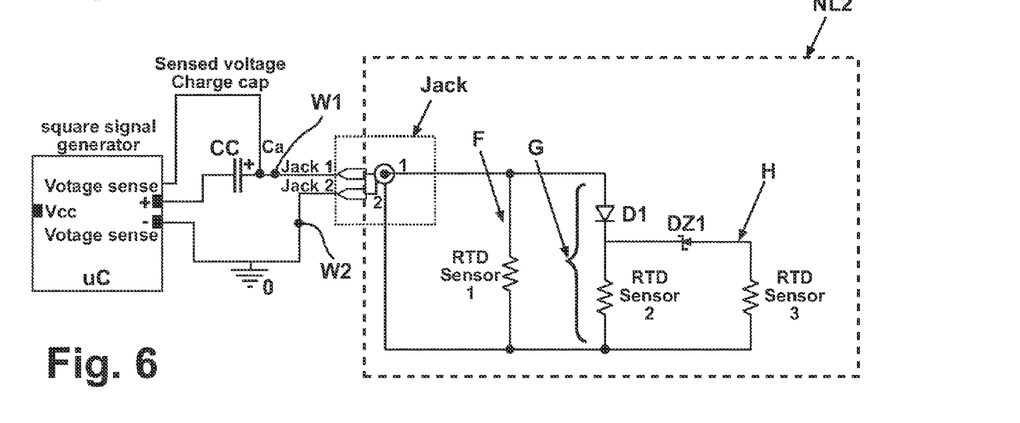
FIG. 6 shows a portion of the second circuit shown in FIG. 5, wherein passive sensors are read during the transient of a discharging capacitor.

With the support of FIG. 6 it is described an alternative method for selectively activating the second embodiment (NL2) of the first nonlinear circuit architecture, in a specific circuit configuration. In fact, this method is applicable only to resistive transducers (RTD sensor1, RTD sensor2, RTD sensor3), three in the described example, when it is not possible to generate multiple DC bias voltage levels (normally in the average low-voltage electronic board the only supply DC voltage is available), and also when a differential measurement of the resistance is not required. Under these conditions of this embodiment the passive sensors are the same of the circuit shown in FIG. 5, while the activation of the branches (F, G, H) of the nonlinear circuit (NL2) is accomplished by using, instead of a DC generator, a charge-discharge electrical component that accumulates reactive energy (as for example, a standard electrolytic aluminum capacitor or either an inductor). In the example a capacitor (CC) is used. The signal exciting the charge of capacitor (CC) is, for instance, a square signal referred to ground/mass, normally generated by any standard micro controller. In a preferred embodiment the charge of the charge-discharge electrical component (CC) can be either obtained with a train of pulses applied to the same component before getting connected to the passive sensors (for instance by means of a controlled switch), prior to its discharge phase, or with a wider amplitude step signal.

The amplitude of the signal generated by the discharging capacitor (CC) covers at least the n voltage biasing values (V0, V1, V2, ..., Vn-1) that the DC generator of the previous described embodiment would have to supply for activating the same branches (F, G, H). A number of at least n measurements, equal to the number of branches, has to be done when the branches (passive sensors) are activated, alone or in combination with other activated branches. Similarly to the previous embodiments, resistance measurements are taken during the timeframe for which the voltage, supplied by the charge capacitor (CC) during its charging or discharging time, enters the voltage band for which the branch/branches become(s) fully conductive.

Measures are taken by the common control/measuring system (uC) sensing the voltage (B) variations across the charge capacitor (CC) during its discharge. A digitally filtered acquisition can also be applied.

Figure 7:
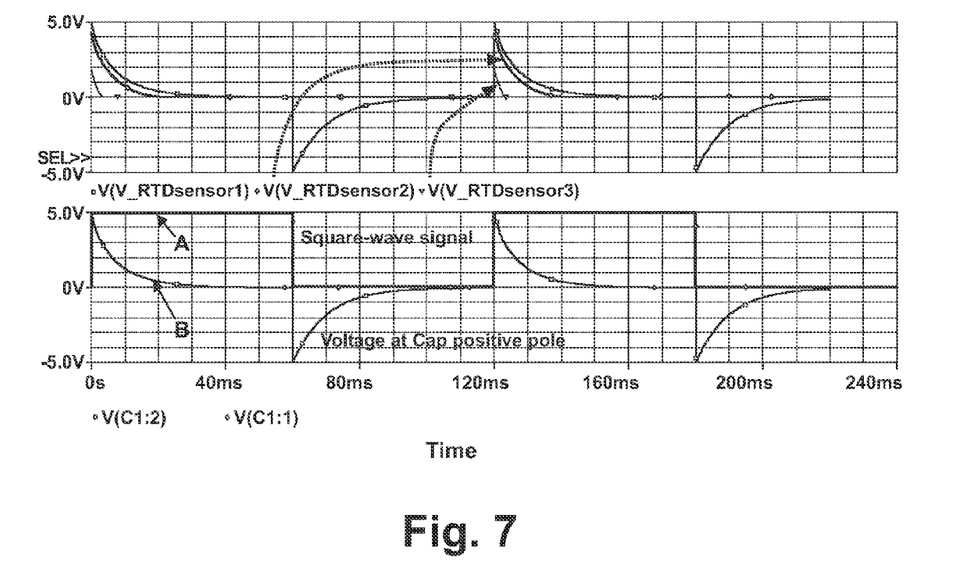
FIG. 7 shows the signals plots of the circuit shown in FIG. 6 during the discharging transient.

In FIG. 7 it is plotted the square wave signal (A) provided by the micro controller (uC) of FIG. 6 feeding the charge capacitor (CC), and the voltage (B) measured between the terminals of the same capacitor (CC). There are also plotted the voltages (V_RTD sensor1, V_RTD sensor2, V_RTD sensor3) measured between the terminals of the respective transducers RTD sensor 1, RTD sensor 2, RTD sensor 3, during the discharging time of the charge capacitor (CC). It is here also observed that the discharge time constants of the capacitor (CC) depends on the values assumed by the resistive transducers connected in series to it.

The n resistance values are then calculated as explained above, with known methods.

This alternative method has been applied to a portion of the same second embodiment circuit (NL2), but it can be also used when having more passive sensors connected to the two-wire analog bus.

In a second set of nonlinear circuit architectures according to the present disclosure, all the branches of the nonlinear circuits, with maybe the exception of the first branch, include a reactive component (an inductor and/or capacitors). The branches, that still are passive sensors, can be selectively activated if supplied with an AC frequency source (OSC) at a proper frequency value FOsci (i=0, ..., n-1) comprised in the admitted range of activation (see FL0, FL1, FL2 in FIG. 9), eventually including the continue value of 0 Hz.

The impedance measurement of the transducers are taken by the common control/measurement system when supplying the nonlinear circuit with the AC variable-frequency source (OSC) at different frequency values. These non linear circuit architectures are particularly suitable for including transducers that vary their capacity or inductance, but can also be used with resistive transducers, as described in the following embodiment.

Figure 8:
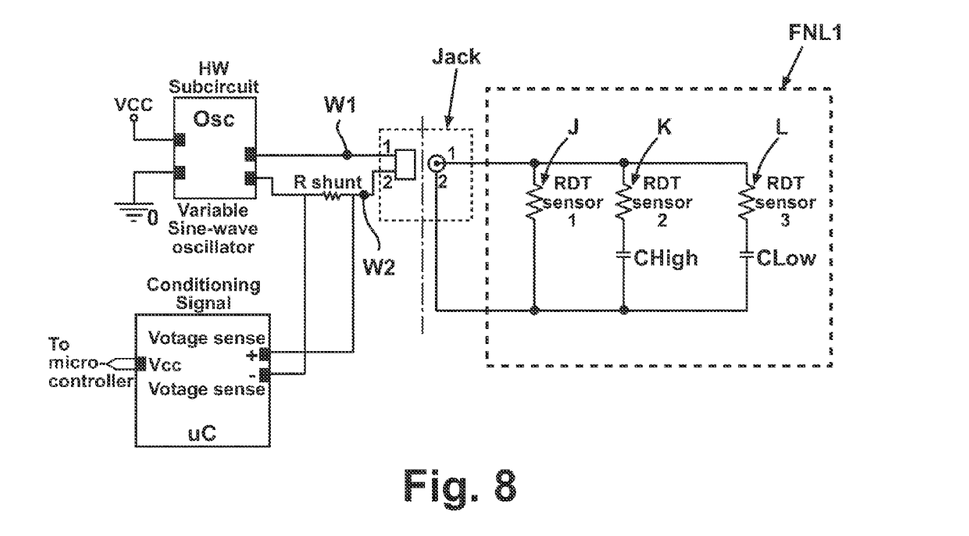
FIG. 8 shows a third circuit according to the present disclosure in which the method is applied.

In FIG. 8 is described a third non linear circuit embodiment (FNL1) belonging to the second set of nonlinear circuit architectures, according to the present disclosure, to which the method of the present disclosure is applied. According to this embodiment the nonlinear circuit (FNL1) is composed by n (n=3 in the example) branches connected to the analog bus (W1, W2) made with two wires only. A first branch (J) includes a resistive transducer (RDT sensor 1), each of the remaining n-1 branches (K, L) include a resistance varying transducer (RDT sensor 2, RDT sensor 3) connected in series with a properly sized capacitor (Clow, Chigh). The sizes of the capacitors (CLow, CHigh) are chosen in order to render the single branches/passive sensors (J, K, L) distinguishable in the domains of frequencies. In the example, capacitors (CHigh, CLow) are sized to space of the n-1 characteristic frequencies Fci (I=0 ... n-1) of the branches for instance of one decade in the logarithmic scale, even if this spacing can be less.

Thanks to this second set of circuit architectures each of the n branches results in a RC network provided with its characteristic frequency (Fc0, Fc1, Fc2). There may be the exception for the first branch for which its characteristic frequency can be null (Fc0=0).

Figure 9:
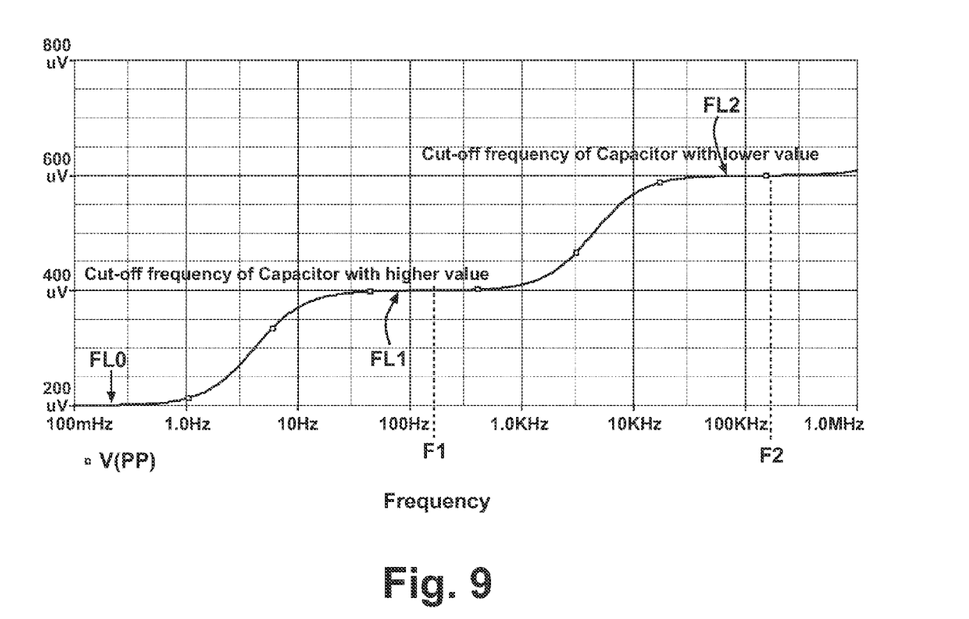
FIG. 9 is a plot of the characteristic curve of the circuit shown in FIG. 8 in the domain of the frequencies.

The frequency domain response of the RC nonlinear circuit of FIG. 8 is plotted in FIG. 9.

In the example the first branch (J) is not provided with characteristic frequency, or it could be said that its characteristic frequency is equal to zero.

The characteristic frequencies (Fc0, Fc1, Fc2) of the single branches (J, K, L) are respectively centered in the substantially flat portions (FL0, FL1, FL2) of the curves. In the first flat portion (FL0) of the characteristic curve only the first branch (J) is activated with a continuous signal (at null frequency). In this portion of the characteristic curve the value of the resistance of the first resistance varying transducer (RDT sensor 1) can be measured.

In the second flat portion (FL1) of the characteristic curve both the first branch (J) and the second branch (K) are activated, and the measured value of the resistance is the parallel of the two activated branches (J, K). In the third flat portion (FL2) of the characteristic curve all the three branches (K, K, L) are activated, and the measured value of the resistance is the parallel of the three activated branches (J, K, L).

Measurements are taken in the flat portions (FL0, FL1, FL2) of the characteristic curve rather than in the sloped portions to avoid the influence of the non completely activated branches. In fact, within each flat portion (FL0, FL1, FL2), the capacitors corresponding to such characteristic frequency and the one provided with lower characteristic frequency can be considered as short circuits, while the branches provided with higher characteristic frequency are not activated, showing an high impedance, approximately considered as an open circuit.

The resistive parts of the capacitor (CLow, CHigh) can be considered as fixed parts of the resistance varying transducers positioned in the respective branches, and therein incorporated. Stray capacities are not considered in a first approximation. Moreover, in the substantially flat zones (FL0, FL1, FL2), capacitors with their tolerances and aging do not affect the measurements.

In the example, the method according to the present disclosure is applied to determine the values of resistive transducers. This is accomplished through the excitation of the circuit through a variable frequency sine-waves oscillator (Osc) circuit, at least at one of the frequency values FOsci (i=0 . . . n−1) comprised in the flat portions (FL0, FL1, FL2) of the characteristic curve and with the measurements of the resistive contribution of the activated branches. The amplitude of the signal read by the common measurement system is linked with the resistance of the sensor belonging to the activated branches.

The resistance values of the circuit can be derived with a simple algebraic calculation.

In the circuit of FIG. 8, during the first measurement step it is applied a DC continue signal, having frequency value FOsc0=0 Hz. The resistance value read by the common control/measurement system (uC) corresponds to RDT sensor 1. The second (K) and third (L) branches are not flown by any current because below their activation frequency. In the second step it is applied an AC signal having Fosc1=115 Hz, the value read is related to the parallel of RDT sensor 1 and RDT sensor 2. The third branch (L) is not flown by any current because below its activation frequency. In a third step FOsc2=115 kHz the value read corresponds to the parallel of RDT sensor 1, RDT sensor 2 and RDT sensor 3. The resistance contribution of the single sensors is then calculated with any of the known methods.

Figure 10:
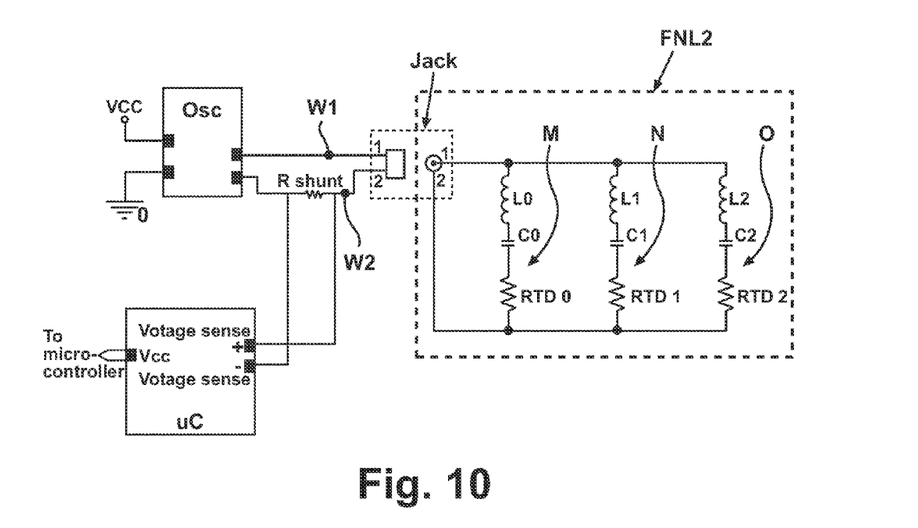
FIG. 10 shows a fourth circuit according to the present disclosure in which the method is applied.

In FIG. 10 it is described a more general embodiment of a non linear circuit described in FIG. 8. This circuit is provided with n branches (in this example n=3, but they could be more), each of them being an LRC resonant circuits and still a passive sensor.

A proper choice of the resonating frequencies FRi i=0 . . . n−1 of the single branches spaced enough each from the others avoids reciprocal interference of the branches impedance.

In each of the n passive sensors connected to the two-wires bus (W1, W2), the transducer through which the physical measure is taken can be either an inductance varying transducer Li, a resistor varying transducer RTD i or a capacitor varying transducer Ci, (i=0 . . . n−1). Preferably, only one transducer should be placed into each single branch. In each branch, the component other than the transducer are preferably chosen of the precision type, in order to obtain a resonant frequency of the branch (FRi) whose variation depends only from the variation of the transducer.

In the circuit example of FIG. 10, for instance, first branch (M) has a resistance varying transducer (RTD 0). Capacitor (C0) and the inductor (L0), are chosen as precision components, defining a resonant frequency $FR0 = \frac{1}{2}*\pi*\sqrt{L0*C0}$. Also the second (N) and the third (O) branch include a resistive varying transducer (RTD 1, RTD 2), and capacitors (C1, C2) and inductors (L1, L2) of the precision type.

In the hypothesis of having the resonant frequencies (FR0, FR1, FR2) sufficiently spaced, for instance of 1 logarithmic decade (or less), stepping the oscillator at the single resonant frequencies it will be possible to activate the single branches (M, N, O). The not activated branches show an impedance that is significantly high, because far enough from their resonating frequencies, and can be considered approximately as open circuits.

In the circuit of FIG. 10, reactive components of signals are not present at each of the resonant frequencies (FR0=F0, FR1=F1, FR2=F2) of the branches (M, N, O); the common control/measurement system would read exactly the resistive component of the sensor contained in the activated branch, linked with the peak value of the measured signal.

The same circuit could also include an additional resistance varying transducer directly connected to the bus (W1, W2) that is in parallel with the other passive sensors connected to the two-wire analog bus.

In others embodiments of the same circuit configuration, when transducer is a varying capacitor Ci, then RTDi and Li components are preferably chosen as precision components in order to obtain the resonant frequency of the branch at "resting conditions", spaced "enough" in the frequency from the ones of the others branches, for instance of about one logarithmic decade.

In a similar manner, if transducer is a inductive varying transducer Li, then RTDi and Ci components are chosen preferably as precision components.

The position in the frequency domains of the resulting n-resonant frequencies (FRi i=0, . . . , n−1) will depend on the impedance value of the transducers (RTD i or Ci).

In these two last configurations of the nonlinear circuit (FNL2) the resonant frequency is linked with the value assumed by the reactive element transducer. For any of the passive sensors there is therefore the need to detect the value of the resonant frequency FRi, and the related peak value.

The detection of the resonant frequency can be made in a known manner, for instance detecting the maximum peak of signal while performing a frequency sweep.

For every type of transducer used (RTDi, Ci or Li), having chosen the other two components as of the precision type, it is always possible to calculate, through the rms values (linked with the peak measured values) its impedance contribution by calculating it with the following known equations:

$$RTD\ i = Vi/Ii$$

$$Ci = 1/SQRT(\omega i * Li)$$

$$Li = 1/SQRT(\omega i * Ci)$$

Figure 11:
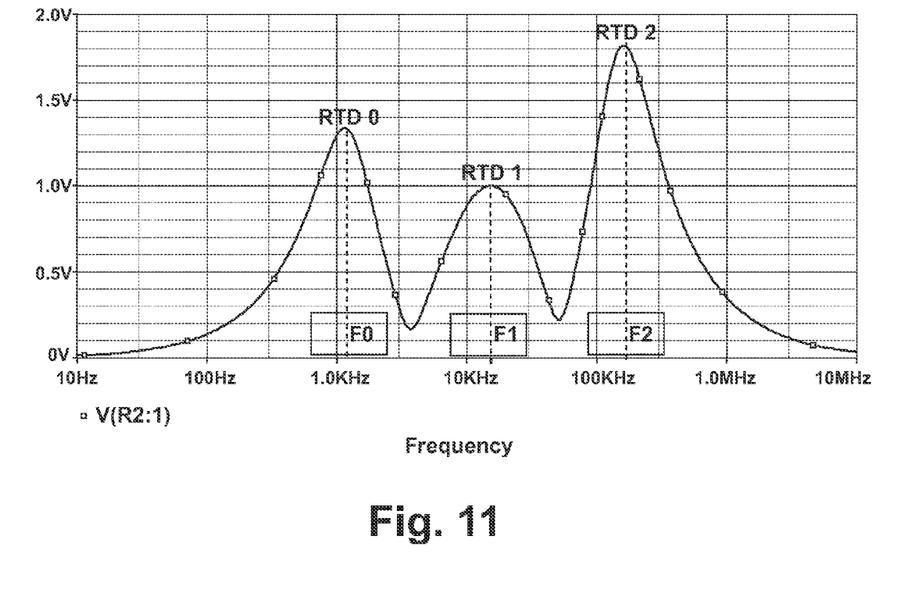
FIG. 11 is a plot of the characteristic curve in the domains of the frequencies, referred to the circuit of FIG. 10.

In FIG. 11 it is plotted the characteristic curve of the resonant (FNL2) circuit of FIG. 10, provided with a nominal spacing of 1 logarithmic decade. Each of the 3 "bells" appearing in the curve is characterized by its peak frequency positioning, the peak magnitude and by the width of its peak. The spacing of the resonating frequencies of the branches is considered to be "enough", when the "bells" are clearly distinguishable.

By applying the method of the present disclosure also on the second set of nonlinear circuit architectures according to the present disclosure, it is possible to read a plurality of passive sensors, which are the single branches, connected to the bus made of two wires only. This is obtained with measurements of the impedance of the whole circuit over a defined frequency range around it characteristic frequency, or in particular, by measuring the circuit impedance at the different resonant frequencies.

While the invention has been describes in terms of various specific embodiments, those skilled in the art will recognize that the invention can be practiced with modification within the spirit and the scope of the claims. In particular, hybrid solutions using voltages and oscillating signals for activating passive sensor are considered to be in the scope of the present invention as well as all the embodiments derivable from the described one by the application of the known electrical equivalence principles.

The same apparatus and method are applicable for other (not listed) types of uses, such as the selective reading of a more complex passive device.

We claim:

1. An apparatus for reading analog signals comprising:
a measurement and control system;
a physical wire connection attached to the measurement and control system;
a plurality of passive sensors including at least three sensors defining a nonlinear circuit connected to the measurement and control system through the physical wire connection, wherein the physical wire connection is made with only two wires and the measurement and control system is configured to receive analog signals through the two wires from the at least three sensors; and
a generator for selectively activating each of the plurality of passive sensors to selectively acquire an analog signal from at least one of the plurality of passive sensors, said measurement and control system being configured to individually analyze analog signals from each of the plurality of passive sensors by measuring electrical parameters of the nonlinear circuit and by calculating an impedance contribution of the at least one of the plurality of sensors, said impedance contribution representing the analog signal from the at least one of the plurality of passive sensors.

2. The apparatus according to claim 1, wherein the plurality of passive sensors contains analog devices only.

3. The apparatus according to claim 1, wherein the plurality of passive sensors is connected directly to the physical wire connection.

4. The apparatus according to claim 1, wherein the plurality of passive sensors includes a passive sensor provided with junction diodes or Zener diodes.

5. The apparatus according to claim 1, wherein the plurality of passive sensors includes a passive sensor associated with a characteristic frequency.

6. The apparatus according to claim 1, wherein the plurality of passive sensors includes a sensor that forms a resonant circuit associated with a resonant frequency.

7. The apparatus according to claim 1, wherein the plurality of passive sensors includes resistive transducers.

8. The apparatus according to claim 7, wherein the apparatus is a meat probe suitable for measuring temperatures in different locations within a domestic cooking oven.

9. The apparatus according to claim 1, wherein the generator is an oscillator selectively activating one of the plurality of passive sensors.

10. A method for reading analog signals from a plurality of passive sensors, connected to a measurement and control system through a physical connection made with only two wires wherein the measurement and control system is configured to receive analog signals through the two wires from the plurality of sensors, said plurality of passive sensors including at least three sensors defining a nonlinear circuit, wherein the method comprises:
selectively activating each of the plurality of passive sensors,
measuring electrical parameters of the nonlinear circuit, and
measuring an impedance contribution from a first sensor of the plurality of passive sensors to individually analyze analog signals from the plurality of passive sensors.

11. The method according to claim 10, wherein selectively activating the one of the plurality of passive sensors is performed by supplying the nonlinear circuit with a voltage stepped signal or a voltage monotonic signal.

12. The method according to claim 11, wherein the nonlinear circuit is supplied with a voltage monotonic signal and the voltage monotonic signal is generated by a reactive component during a charge or discharge transient.

13. The method according to claim 10, wherein selectively activating the one of the plurality of passive sensors is performed by applying a frequency signal having frequency values to the nonlinear circuit, at least one of the frequency values being in flat portions of a characteristic curve.

14. The method according to claim 13, wherein the nonlinear circuit includes resonant frequencies and characteristic frequencies, and the frequency signal has a frequency equal or close to at least one of the resonant frequencies of the nonlinear circuit or to at least one of the characteristic frequencies of the nonlinear circuit.

15. The method according to claim 14, wherein measuring the electrical parameters of the nonlinear circuit starts when one of the resonant frequencies of the nonlinear circuit is identified.

16. The method according to claim 10, wherein measuring the electrical parameters of the nonlinear circuit is in synchronism with selectively activating the one of the plurality of passive sensors.

17. The method according to claim 10, wherein calculating impedance contributions of the one of the plurality of passive sensors is accomplished by using the electrical parameters.

18. The method according to claim 10, wherein the impedance contribution is a resistive contribution.

19. The method according to claim 10, further comprising:
measuring a combined impedance contribution from the first sensor and a second sensor of the plurality of passive sensors; and
calculating an impedance contribution from the second sensor based on the impedance contribution of the first sensor and the combined impedance contribution of the first and second sensors.

20. The method according to claim 19, further comprising:
measuring a combined impedance contribution from the first, the second and a third sensor of the plurality of passive sensors; and
calculating an impedance contribution from the third sensor based on the impedance contribution of the first and second sensors and the combined impedance contribution of the first, second and third sensors.

* * * * *